(12) United States Patent
Kim

(10) Patent No.: US 12,208,784 B2
(45) Date of Patent: Jan. 28, 2025

(54) HYBRID VEHICLE AND CONTROL METHOD OF ENGINE START THEREFOR

(71) Applicants: Hyundai Motor Company, Seoul (KR); Kia Corporation, Seoul (KR)

(72) Inventor: Jin Sung Kim, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 281 days.

(21) Appl. No.: 17/973,089

(22) Filed: Oct. 25, 2022

(65) Prior Publication Data

US 2023/0134693 A1 May 4, 2023

(30) Foreign Application Priority Data

Oct. 28, 2021 (KR) .................. 10-2021-0145406

(51) Int. Cl.
*B60W 20/10* (2016.01)
*B60W 30/06* (2006.01)

(52) U.S. Cl.
CPC ............ *B60W 20/10* (2013.01); *B60W 30/06* (2013.01); *B60W 2510/087* (2013.01); *B60W 2510/244* (2013.01); *B60W 2540/10* (2013.01)

(58) Field of Classification Search
CPC ............... B60W 20/10; B60W 30/06; B60W 2510/087; B60W 2510/244; B60W 2540/10
See application file for complete search history.

(56) References Cited

U.S. PATENT DOCUMENTS

| 12,084,040 B2* | 9/2024 | Ohta ................. B60W 20/12 |
| 2011/0166734 A1* | 7/2011 | Ferguson ............ F02N 11/0807 903/902 |

FOREIGN PATENT DOCUMENTS

| KR | 10-2019-0049157 A | 5/2019 |
| KR | 102362212 B1 | 2/2022 |

* cited by examiner

*Primary Examiner* — Ramsey Refai
(74) *Attorney, Agent, or Firm* — Fox Rothschild LLP

(57) ABSTRACT

Disclosed herein is a method of controlling an engine start in a hybrid vehicle. The method comprises activating a remote smart parking assist (RSPA) function when a remote smart assist signal is received, determining whether to start an engine of a hybrid vehicle based on a current state of the hybrid vehicle in which the RSPA function is activated, setting a first driving mode using an electric motor when it is determined that the engine is not able to be started, and releasing the first driving mode when a riding determination condition is satisfied in a state of the first driving mode.

19 Claims, 6 Drawing Sheets

HYBRID VEHICLE AND CONTROL METHOD OF ENGINE START THEREFOR

CROSS REFERENCE TO RELATED APPLICATION(S)

This application claims, under 35 U.S.C. § 119(a), the benefit of Korean Patent Application No. 10-2021-0145406, filed on Oct. 28, 2021, which is incorporated herein by reference in its entirety.

BACKGROUND

Technical Field

Embodiments of the present disclosure relate to a hybrid vehicle, an engine of which is able to be started only when it is determined that a driver has a driving intention or is in the hybrid vehicle when remote smart parking assist is activated, and a control method of engine start therefor.

Description of the Related Art

With the recent increase in interest in the environment, a number of hybrid electric vehicles (HEVs) or electric vehicles (EVs) using electric motors as driving sources have been developed.

An HEV generally refers to a vehicle that uses two power sources together, which are, mainly, an engine and an electric motor. A number of HEVs have been developed in recent years because they are advantageous in reducing exhaust gas as well as having excellent fuel efficiency and power performance, compared to vehicles having only an internal combustion engine. In particular, an HEV capable of charging a battery through a plug using external power, rather than engine power or regenerative braking, is referred to as a plug-in hybrid electric vehicle (PHEV).

In a conventional HEV, control for catalyst heating is performed to reduce exhaust gas in the initial stage of engine start during transition to an HEV mode. The catalyst heating allows the engine to be started and controlled for inefficient combustion, so it is common to use the combustion heat at this time. However, since the engine is maintained at room temperature when the vehicle is parked for longer than a particular length of time, the engine is started for catalyst heating when the driver presses a start button.

Meanwhile, in a conventional HEV, when the engine is unnecessarily started when only luggage is picked up in a narrow parking region (for example, only luggage is picked up and the vehicle returns to its original position), or when the engine is started before the driver or passenger (infant) gets into the vehicle, sudden engine start sounds and exhaust gas emissions before catalyst heating may cause discomfort to the driver or passenger.

SUMMARY

Accordingly, the present disclosure is directed to a hybrid vehicle and a control method of an engine start therefor that substantially obviate one or more problems due to limitations and disadvantages of the related art.

An object of the present disclosure is to provide a hybrid vehicle, an engine of which is able to be started in consideration of its surroundings, and a control method of engine start therefor.

Another object of the present disclosure is to provide a hybrid vehicle, an engine of which is able to be started only when it is determined that a driver has a driving intention or is in the hybrid vehicle when remote smart parking assist is activated, and a control method of engine start therefor.

The present disclosure is not limited to the above-mentioned objects, and other objects of the present disclosure can be clearly understood by those skilled in the art to which the present disclosure pertains from the following description.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, there is a provided a method of controlling engine start in hybrid vehicles, which comprises activating a remote smart parking assist (RSPA) function when a remote smart assist signal is received, determining whether to start an engine of a hybrid vehicle based on a current state of the hybrid vehicle in which the RSPA function is activated, setting a first driving mode using an electric motor when it is determined that the engine is not able to be started, and releasing the first driving mode when a riding determination condition is satisfied in the state of the first driving mode.

In accordance with another aspect of the present disclosure, there is provided a hybrid vehicle that comprises a hybrid control unit configured to control a remote smart parking assist (RSPA) function when a remote smart assist signal is received. The hybrid control unit comprises a determination unit configured to determine whether to start an engine of the hybrid vehicle based on a current state of the hybrid vehicle in which the RSPA function is activated, a setting unit configured to set a first driving mode using an electric motor when it is determined that the engine is not able to be started, and a releasing unit configured to release the first driving mode when a riding determination condition is satisfied in the state of the first driving mode.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Figure 1:
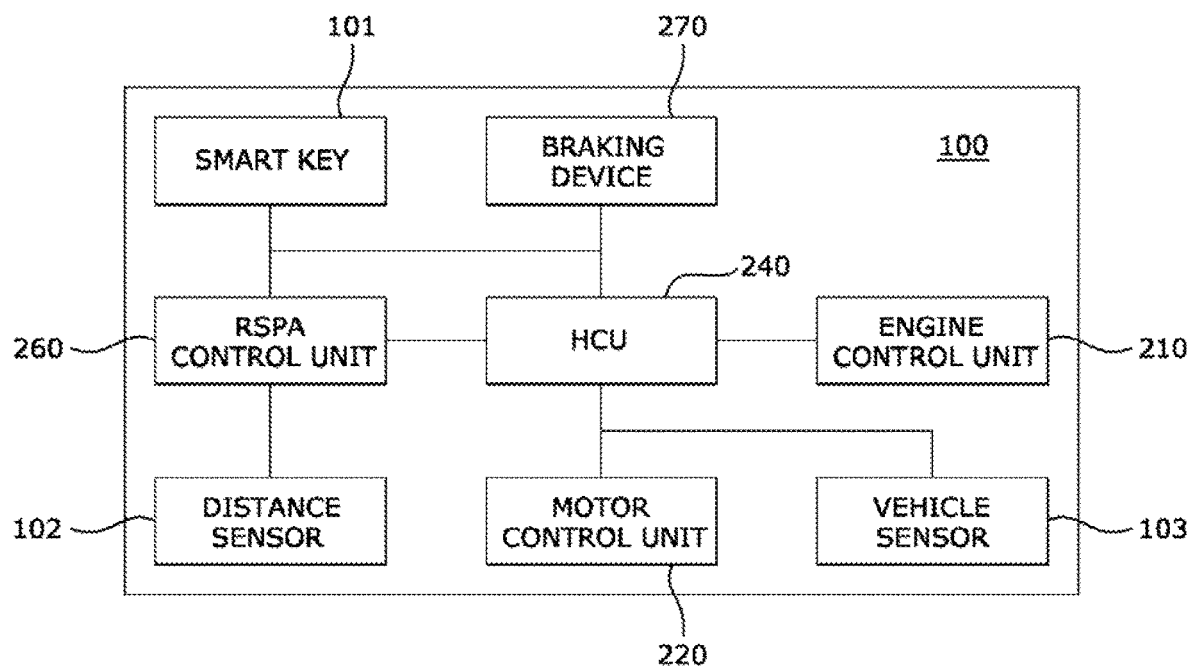
FIG. 1 is a block diagram illustrating a configuration of a hybrid vehicle that is applicable to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Exemplary embodiments of the present disclosure will be described below in detail with reference to the accompanying drawings so as to be easily realized by those skilled in the art to which the present disclosure pertains. The present disclosure may, however, be embodied in different forms and should not be construed as being limited to the embodiments set forth herein. In order to clearly illustrate the present disclosure in the drawings, parts irrelevant to the description may be omitted in the drawings, and like reference numerals refer to like elements throughout the specification.

Throughout the specification, it will be understood that when a component is referred to as "comprising/including" any component, it does not exclude other components, but can further comprise/include the other components unless specified otherwise. Throughout the specification, the same reference numerals designate the same constituent elements.

In addition, the unit or control unit included in the name of a hybrid control unit (HCU) or the like is only a term widely used in naming a control unit (controller) for controlling a specific function of the vehicle, and does not mean a generic functional unit. For example, each control unit may include a communication device that communicates with other control units or sensors to control the function it is responsible for, a memory that stores an operating system or logic commands and input/output information, and one or more processors that perform determination, calculation, decision, etc. necessary for controlling the function in charge thereof.

In embodiments of the present disclosure, a vehicle control unit determines whether to start an engine for a hybrid vehicle based on the current state of the hybrid vehicle with a remote smart parking assist (RSPA) function activated, sets a first driving mode using an electric motor upon determining that the engine is not able to be started, and releases the first driving mode when a riding determination condition is satisfied in the state of the first driving mode. Therefore, it is possible to prevent unnecessary engine start and thus fuel consumption.

Prior to describing a method of controlling engine start in hybrid vehicles according to embodiments of the present disclosure, a structure and a control system of a hybrid vehicle that is applicable to the embodiments will be described with reference to FIGS. 1 to 3.

FIG. 1 is a block diagram illustrating a configuration of the hybrid vehicle that is applicable to the embodiments of the present disclosure.

Referring to FIG. 1, the hybrid vehicle, which is designated by reference numeral 100, according to the embodiments may comprise a smart key 101, a remote smart parking assist (RSPA) control unit 260, a distance sensor 102, a braking device 270, a hybrid control unit (HCU) 240, a motor control unit (MCU) 220, an engine control unit 210, and a vehicle sensor 103.

The smart key 101 may be configured to transmit a start signal for starting of the hybrid vehicle 100 to the hybrid control unit 240, and may be configured to transmit a forward/backward remote operation signal for movement of the hybrid vehicle 100 forward or backward to the RSPA control unit 260. The forward/backward remote operation signal may be referred to as a remote smart assist signal.

The smart key 101 may comprise an integrated body unit (IBU). For example, the IBU may integrate one or more electronic control units (ECUs), such as a body control module (BCM), a tire pressure warning system (TPMS), and a parking assist system (PAS), into one unit.

When the forward/backward remote operation signal is transmitted from the smart key 101, the RSPA control unit 260 may be configured to transmit a vehicle control signal to each control unit for remote smart parking.

At least one distance sensor 102 may be disposed in the front or rear of the hybrid vehicle 100. The distance sensor 102 may be configured to assist the hybrid vehicle 100 to park or pull out while searching for a parking space of the hybrid vehicle 100 or recognizing obstacles in the vicinity of the hybrid vehicle 100.

The braking device 270 may be engaged with an electronic parking brake (EPB) upon completion of automatic braking and parking during parking assistance, and may be configured to control the EPB.

The HCU 240 may be configured to control torque distribution (to EMS/MCU) for remote smart parking/pulling out, determination of engine start, and the like. A detailed description thereof will be given later.

The motor control unit 220 may be configured to control the operation of a motor for parking/pulling out under the control of the HCU 240.

The engine control unit 210 may be configured to control the start of the engine for parking/pulling out under the control of the HCU 240.

At least one vehicle sensor 103 may be disposed inside the hybrid vehicle 100. For example, the vehicle sensor 103 may comprise a door (trunk)/seat/belt sensor. The vehicle sensor 103 may be configured to sense or detect a driver/occupant or the like under the control of the HCU 240.

The above-mentioned smart key 101, RSPA control unit 260, distance sensor 102, braking device 270, HCU 240, motor control unit 220, engine control unit 210, and vehicle sensor 103 may be configured to transmit or receive signals through controller area network (CAN), LIN, H/Wire, in-vehicle communication, or the like. For example, CAN allows the individual control units to be connected in parallel by two wires (CAN LOW and CAN HIGH) to exchange signals or data through a predetermined CAN protocol (data transmission method, data transmission rate, priority, etc.).

Figure 2:
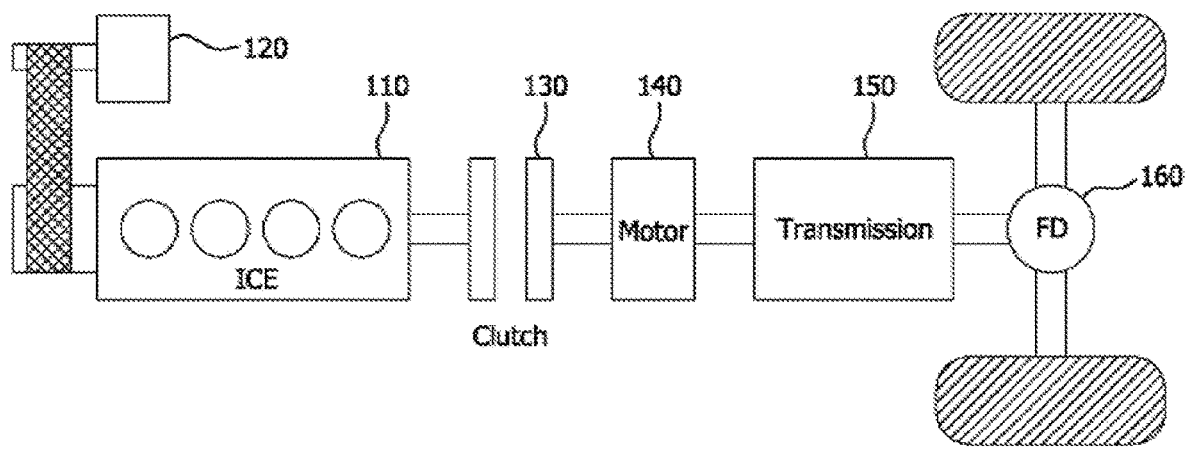
FIG. 2 illustrates an exemplary configuration of the hybrid vehicle that is applicable to the embodiments of the present disclosure.

FIG. 2 illustrates an exemplary configuration of the hybrid vehicle that is applicable to the embodiments of the present disclosure.

Referring to FIG. 2, the hybrid vehicle 100 according to the embodiments may comprise a parallel type (or transmission mounted electric drive (TMED)) hybrid powertrain in which an electric motor (or drive motor) 140 and an engine clutch (EC) 130 are mounted between an internal combustion engine (ICE) 110 and a transmission 150.

In the hybrid vehicle 100, in general, when a driver depresses an accelerator after starting, the motor (or drive motor) 140 is driven using the electric power of a battery (not shown) with the engine clutch 130 opened, and the power of the motor 140 is transmitted to the transmission 150 and a final drive (FD) 160 to rotate wheels (i.e., EV mode). When a greater driving force is required while the hybrid vehicle 100 is gradually accelerated, a starter generator motor 120 may be configured to operate to drive the engine 110.

Accordingly, when the rotational speed of the engine 110 is substantially equal to that of the motor 140, the engine clutch 130 is then engaged therewith so that the engine 110 or the engine 110 and the motor 140 together drive the hybrid vehicle 100 (i.e., transition from EV mode to HEV mode). When a preset engine-off condition is satisfied, such as when the hybrid vehicle 100 is decelerated, the engine clutch 130 is opened and the engine 110 is stopped (i.e., transition from HEV mode to EV mode). In addition, in the hybrid vehicle 100, the battery (not shown) may be charged by converting the driving force of the wheels into electric energy during braking, which is referred to as braking energy regeneration or regenerative braking.

The starter generator motor 120 serves as a starter motor when the engine 110 is started, and operates as a generator when the rotational energy of the engine 110 is recovered after the engine is started or when the engine 110 is turned off. Therefore, the starter generator motor 120 may be referred to as a "hybrid starter generator (HSG)", and in some cases, may also be referred to as an "auxiliary motor".

The correlation between the control units in the hybrid vehicle 100 using the above-mentioned powertrain will be described with reference to FIG. 3.

Figure 3:
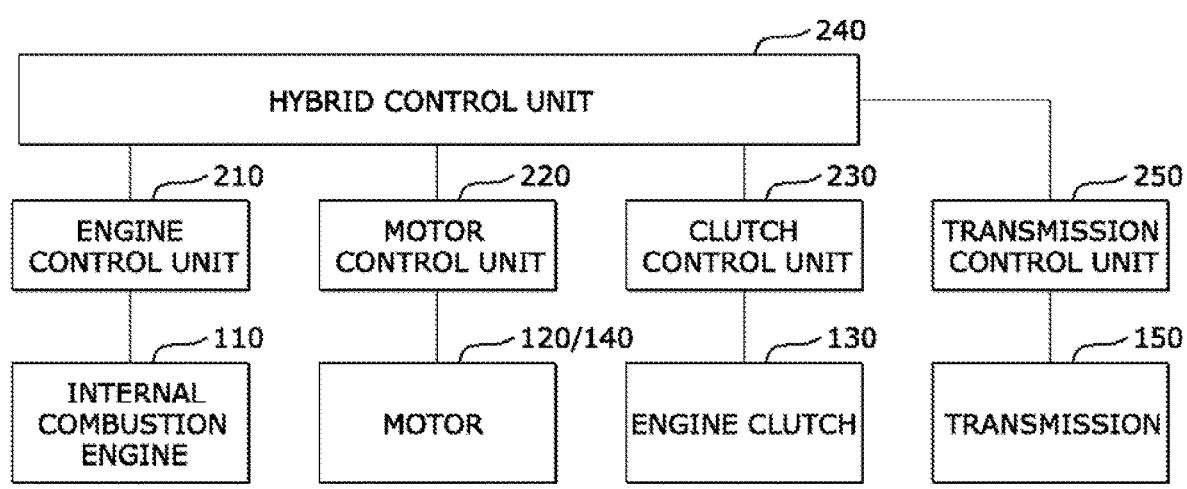
FIG. 3 is a block diagram illustrating an exemplary control system of the hybrid vehicle that is applicable to the embodiments of the present disclosure.

FIG. 3 is a block diagram illustrating an exemplary control system of the hybrid vehicle that is applicable to the embodiments of the present disclosure.

Referring to FIG. 3, in the hybrid vehicle 100 that is applicable to the embodiments of the present disclosure, the internal combustion engine 110 may be configured to be controlled by the engine control unit 210, the torque of the starter generator motor 120 and the drive motor 140 may be configured to be controlled by the MCU 220, and the engine clutch 130 may be configured to be controlled by a clutch control unit 230. Here, the engine control unit 210 is also referred to as an engine management system (EMS). The transmission 150 may be configured to be controlled by a transmission control unit 250. In some cases, a controller for the starter generator motor 120 and a controller for the drive motor 140 may be provided separately.

Each of the control units may be connected to the hybrid control unit 240 that is its superordinate control unit and controls the overall mode transition process, to provide the HCU 240 with information necessary for driving mode change, engine clutch control when shifting gears, and/or engine stop control under the control of the HCU 240, or to operate in response to the control signal from the HCU 240.

For example, the hybrid control unit 240 may be configured to control the overall powertrain in driving the hybrid vehicle 100. For example, the hybrid control unit 240 may be configured to determine when the engine clutch 130 is released (open). The hybrid control unit 240 may be configured to determine the state (lock-up, slip, open, etc.) of the engine clutch 130 and control the timing of stopping the injection of fuel into the engine 110. In order to control engine stop, the hybrid control unit 240 may be configured to transmit a torque command for controlling the torque of the starter generator motor 120 to the motor control unit 220 to control the rotational energy of the engine to be recovered. In addition, the hybrid control unit 240 can control a subordinate control unit for determining a mode switching condition and switching modes during mode switching control according to the embodiments of the present disclosure, which will be described later.

Moreover, when a remote smart assist signal is received, the hybrid control unit 240 may be configured to control an RSPA function to be activated and determine whether to start the engine based on the current state of the hybrid vehicle 100 with the RSPA function activated. When it is determined that the engine is not able to be started be started, the hybrid control unit 240 may be configured to control a first driving mode using the electric motor to be set. When a riding determination condition is satisfied in the state of the first driving mode, the hybrid control unit 240 may be configured to control the first driving mode to be released and switched to a second driving mode in which the engine is able to be started.

Of course, it is apparent to those skilled in the art that the above-mentioned connection relationship between the control units and function/classification of each control unit are merely illustrative and are not limited to the names thereof. For example, the hybrid control unit 240 may be configured to be implemented such that the function thereof is replaced in any one of the other control units, or is distributed in two or more of the other control units.

Hereinafter, a schematic structure in which the above-mentioned processes are performed and a system configuration therefor will be described with reference to FIG. 4. A method of more efficiently controlling engine start and a vehicle structure therefor according to an exemplary embodiment of the present disclosure will be described.

Figure 4:
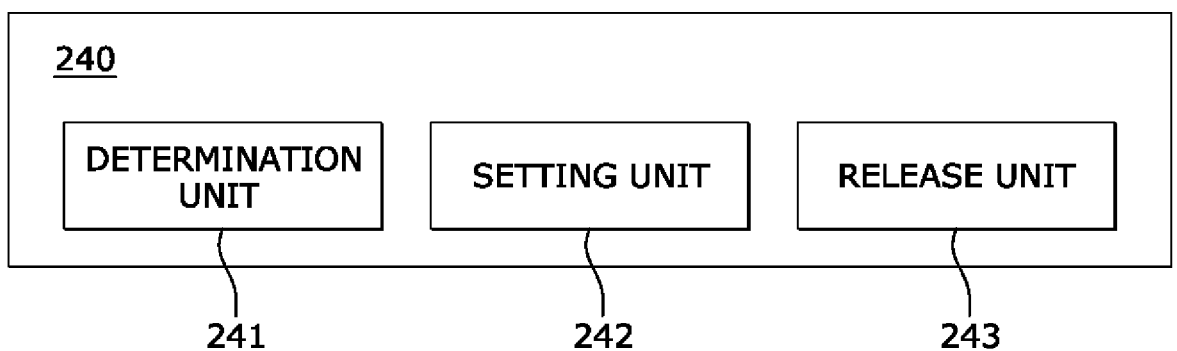
FIG. 4 is a block diagram illustrating an exemplary structure of the hybrid vehicle for performing engine start control according to an exemplary embodiment of the present disclosure.

FIG. 4 is a block diagram illustrating an exemplary structure of the hybrid vehicle for performing engine start control according to an exemplary embodiment of the present disclosure.

In the following drawings and description including FIG. 4, it is assumed that the control unit for controlling engine start or an electric motor is a hybrid control unit 240. However, this is exemplary and the present disclosure is not necessarily limited thereto.

In particular, the structure of the control unit illustrated in FIG. 4 may be applied to an EV mode or a charge depleting (CD) mode of the hybrid vehicle 100. Referring to FIG. 4, the hybrid control unit 240 may comprise a determination unit 241, a setting unit 242, and a release unit 243.

When the remote smart assist signal is received, the hybrid control unit 240 may be configured to control a remote smart parking assist (RSPA) function. The remote smart assist signal may be received through a communication module under the control of the hybrid control unit 240. The communication module may be referred to as a transceiver. The transceiver may have a structure in which a transmitter and a receiver are combined into one package.

The determination unit 241 may be configured to determine whether to start the engine of the hybrid vehicle 100 based on the current state of the hybrid vehicle 100 in which the RSPA function is activated. The current state of the hybrid vehicle 100 may be referred to as an engine start constraint state or an engine start constraint condition. For example, when the current state of the hybrid vehicle 100 satisfies at least one of a system state condition, a driving state condition, and a driver's intention condition, the determination unit 241 may be configured to determine that the engine is able to be started.

In the system state condition, the current state of the hybrid vehicle 100 may be checked by detecting an state of charge (SOC) of the battery or a state of the electric motor in real time. The system state condition may mean whether the engine needs to be started for the protection of the system. For example, when the SOC of the high-voltage battery for driving the electric motor is lower than a preset reference SOC value, the first driving mode may not be performed. The first driving mode may be referred to as an EV driving mode. However, the present disclosure is not limited thereto. For example, when the EV driving mode is performed in an over-temperature situation where the electric motor and/or high-voltage battery is higher than a preset reference temperature, the output thereof may be additionally limited or parts thereof may be damaged. For this reason, the EV driving mode may not be performed as well.

For example, the determination unit 241 may be configured to determine that the engine is able to be started when the SOC of the battery in the hybrid vehicle 100 is lower than a preset reference SOC in the system state condition. The determination unit 241 may be configured to determine that the engine is able to be started when the electric motor is higher than a preset reference motor temperature in the system state condition. The determination unit 241 may be configured to determine that the engine is able to be started when the temperature of the battery in the hybrid vehicle 100 is higher than a preset reference battery temperature in the system state condition.

In the driving state condition, the current state of the hybrid vehicle 100 may be checked by detecting an inclination of the hybrid vehicle 100 that is parked or pulled out. The driving state condition may mean whether the inclination of the driving road is equal to or greater than a certain range. For example, the electric motor alone is not able to provide sufficient driving force in the case of steep slopes, and rapid battery consumption during driving continuously may cause a deterioration in SOC balancing, which may make the EV driving mode unsuitable.

For example, the determination unit 241 may be configured to determine that the engine is able to be started when the inclination of the hybrid vehicle 100 that is parked or pulled out is greater than a preset reference inclination. The determination unit 241 may be configured to memorize or store a change in inclination for future use in the case of a previous key-off situation in order to improve the accuracy of the inclination.

In the driver's intention condition, the current state of the hybrid vehicle 100 may be checked through detection by an accelerator pedal sensor. The driver's intention condition may be a condition related to the torque or power required by the driver. For example, when a driver performs full acceleration (full aps) to avoid a dangerous situation, or continues to drive at high speed to drive according to the flow of traffic on a highway, the EV driving mode may be unsuitable.

For example, the determination unit 241 may be configured to determine that the engine is able to be started when the required power based on the accelerator pedal sensor exceeds the maximum output of the electric motor.

The setting unit 242 may be configured to set a first driving mode or a second driving mode according to the determination of whether to start the engine. For example, the setting unit 242 may be configured to either set the first driving mode using the electric motor when it is determined that the engine is not able to be started, or set the second driving mode in which the engine is started when it is determined that the engine is able to be started. The first driving mode may be referred to as an EV driving mode, and the second driving mode may be referred to as a normal driving mode.

The setting unit 242 may be configured to analyze a driver's driving pattern and set the first driving mode or the second driving mode based on the result value of the analyzed driving pattern. A detailed description thereof will be given later.

The release unit 243 may be configured to release the first driving mode when the riding determination condition is satisfied in the state of the first driving mode. The release unit 243 may be configured to release the first driving mode under the control of the hybrid control unit 240 and switch to the second driving mode in which the engine is able to be started.

The release unit 243 may be configured to be electrically connected to at least one vehicle sensor 103 (see FIG. 1) disposed in the hybrid vehicle 100. For example, the release unit 243 may be configured to use at least one vehicle sensor 103 installed in the hybrid vehicle 100 to detect the trunk, the door, the driver's seat, and the safety belt of the hybrid vehicle 100, and the vicinity of the hybrid vehicle 100. For example, a plurality of vehicle sensors 103 may comprise a driver's seat sensor, a driver's seat safety belt sensor, and the like.

The release unit 243 may be configured to receive a plurality of detected values from the vehicle sensors 103 under the control of the hybrid control unit 240, and determine a riding determination condition based on the detected values provided thereto.

For example, the release unit 243 may be configured to determine that the riding determination condition is satisfied, when it receives, from the plurality of vehicle sensors 103, all of a detection value indicating that at least one trunk is closed, a detection value indicating that a driver is in a driver's seat or that a driver's seat safety belt is engaged, and a detection value indicating that there is no change in position in the vicinity of the hybrid vehicle. The release unit 243 may be configured to determine that the riding determination condition is satisfied only when all of the above-mentioned detection values are provided, whereas it may be configured to determine that the riding determination condition is not satisfied when any one of the above-mentioned detection values is not provided.

Here, each of the vehicle sensors 103 may comprise at least one image acquisition device such as a camera, to acquire an image around the hybrid vehicle 100. The release unit 243 may be configured to determine whether there is a movement or a change in position in the vicinity of the hybrid vehicle 100 by performing processes such as extracting feature points and recognizing objects through the acquired image. The vehicle sensor 103 may be configured to use an image acquisition means provided in an advanced driving assistance system (ADAS), or may be included in an advanced driving assistance system (ADAS).

When the riding determination condition is satisfied, the release unit 243 may be configured to determine that the EV driving mode is not suitable, thereby releasing the EV driving mode and switching to the normal driving mode in which the engine is able to be started. The normal driving mode may be referred to as a second EV driving mode.

As described above, the hybrid control unit 240 may be configured to control the above-mentioned determination unit 241, setting unit 242, and release unit 243 to determine whether the engine start constraint condition is satisfied and whether the EV driving mode is able to be performed accordingly, and may be configured to determine whether to prioritize the EV mode for driving or whether to start the engine according to the result of the determination and control the same.

That is, the hybrid control unit 240 may be configured to control the engine start to be as limited as possible when the RSPA is activatable in the EV mode. The engine of the hybrid vehicle 100 may be configured to be started only when it is determined that both the driver and the passenger are in the vehicle or the driver has a driving intention under the control of the hybrid control unit 240.

For example, the hybrid control unit 240 may be configured to determine whether the driver and the passenger are in the vehicle by checking whether both the vehicle door and the vehicle trunk are closed, whether the driver is in the vehicle through the driver's seat sensor and the driver's seat belt sensor, whether the passenger is in the vehicle through the passenger's seat sensor and the passenger's seat belt sensor, and whether there is a change in position of an object/obstacle in the proximity of the vehicle through the ultrasonic sensor. If it is determined that both the driver and the passenger are in the vehicle, the hybrid control unit 240 may be configured to release the EV limit mode.

The hybrid control unit 240 may be configured to notify the driver that the EV driving mode is unsuitable through the display disposed in the hybrid vehicle 100, or notify the driver of prioritizing the EV driving mode for driving or releasing the EV driving mode to switch to the normal driving mode. For example, the hybrid control unit 240 may be configured to control engine start limit information to be expressed to the user using a voice message/alarm sound/display device (navigation, cluster, smart phone, mobile phone (e.g., Blue Link application)) during RSPA activation and may be configured to control whether to continue to limit the engine start to be selected.

In addition, when luggage is loaded/unloaded for a long time after RSPA activation, the hybrid control unit 240 may be configured to select whether to continue to limit the operation of the engine, or may be configured to induce RSPA interruption or enter a sleep mode in order to limit the discharge of the battery in the hybrid vehicle 100.

Moreover, the hybrid control unit 240 may be configured to control whether to use the engine start limit to be selected during RSPA activation using the option menu.

The above-mentioned method of controlling engine start in hybrid vehicles according to the embodiment of the present disclosure will be described in more detail below.

Figure 5:
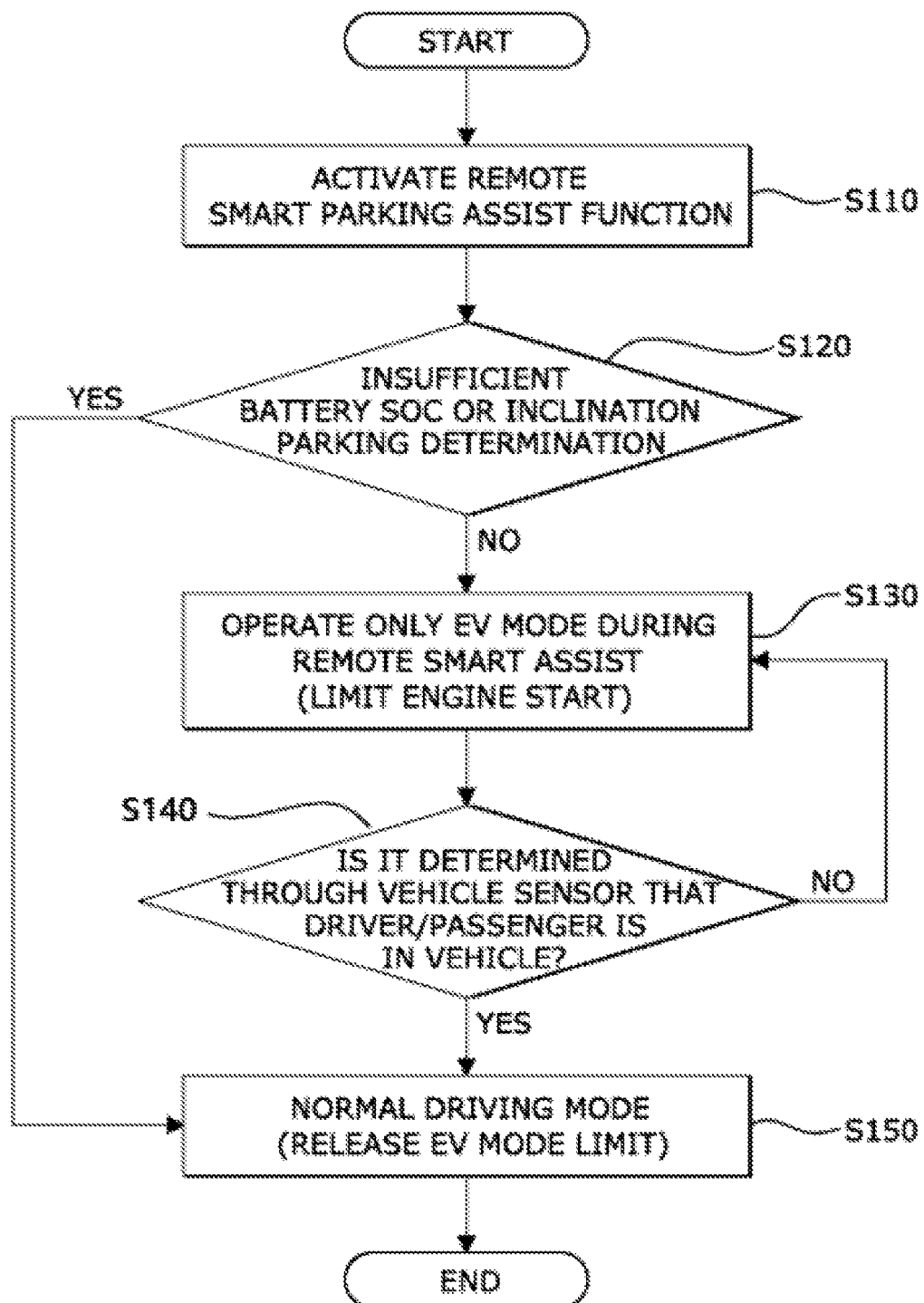
FIG. 5 is a flowchart for explaining an exemplary method of controlling engine start in hybrid vehicles according to an exemplary embodiment of the present disclosure.

FIG. 5 is a flowchart for explaining an exemplary method of controlling engine start in hybrid vehicles according to an exemplary embodiment of the present disclosure.

Referring to FIG. 5, the method of controlling engine start in hybrid vehicles according to the embodiment of the present disclosure may comprise an operation step S110, a determination step S120, a setting step S130, and a release step S150.

When a remote smart assist signal is received, the operation step S110 may activate a remote smart parking assist (RSPA) function. That is, the operation step S110 may activate a remote smart parking assist function.

The determination step S120 may determine whether to start an engine of a hybrid vehicle based on the current state of the hybrid vehicle in which the RSPA function is activated.

When the current state of the hybrid vehicle satisfies at least one of a system state condition, a driving state condition, and a driver's intention condition, the determination step S120 may determine that the engine is able to be started. For example, the determination step S120 may determine whether an EV mode is able to be operated by checking whether an SOC of a main battery is insufficient and an inclination.

When it is determined that only the EV mode is not operable, the determination step S120 may terminate the mode or switch to a normal mode in which the engine is able to be started (S150). The EV mode may be referred to as a first mode, and the normal mode may be referred to as an engine operable mode or a second mode. A description thereof will be omitted since it has been sufficiently given with reference to FIG. 4.

When it is determined that the engine is not able to be started, the setting step S130 may set a first driving mode using an electric motor. When it is determined that the engine is able to be started, the setting step S130 may set a second driving mode in which the engine is started instead of the electric motor. For example, the setting step S130 may operate only the EV mode during remote smart assist according to the surrounding environment, and limit the engine start.

The release step S150 may release the first driving mode when a riding determination condition is satisfied in the state of the first driving mode (S140).

The release step S150 may comprise a switching step of switching a driving mode. The switching step may release the first driving mode and switch to the second driving mode in which the engine is able to be started.

The release step S150 may limit the EV mode until a driver/passenger gets into the vehicle. For example, when it is determined through a vehicle sensor that the driver and the passenger are in the vehicle in the riding determination condition, the mode may be terminated or switched to the engine operable mode. The riding determination condition for determining that the driver and the passenger are in the vehicle may comprise a state in which both a trunk and a door are closed, whether a driver is seated in a driver's seat or whether a driver's seat belt (or safety belt) is worn, whether there is a change in position of a user/object in the close proximity of the vehicle, and the like.

The release step S150 may allow the engine to be started only when it is determined that both the driver and the passenger are in the vehicle or the driver has a driving intention. The release step S150 may determine whether the driver and the passenger are in the vehicle by checking whether both the vehicle door and the vehicle trunk are closed, whether the driver is in the vehicle through a driver's seat sensor and a driver's seat belt sensor, and whether there is a change in position of an object/obstacle in the proximity of the vehicle through an ultrasonic sensor If it is determined that both the driver and the passenger are in the vehicle, the release step S150 may release the EV mode. A detailed description thereof will be omitted since it has been sufficiently given with reference to FIG. 4.

That is, as described above, the method of controlling engine start in hybrid vehicles according to the embodiment of the present disclosure may be performed to operate the motor by raising the EV mode rather than unconditionally limiting the engine start during RSPA activation, and to operate the engine by limiting the engine start when the required torque is large.

Figure 6:
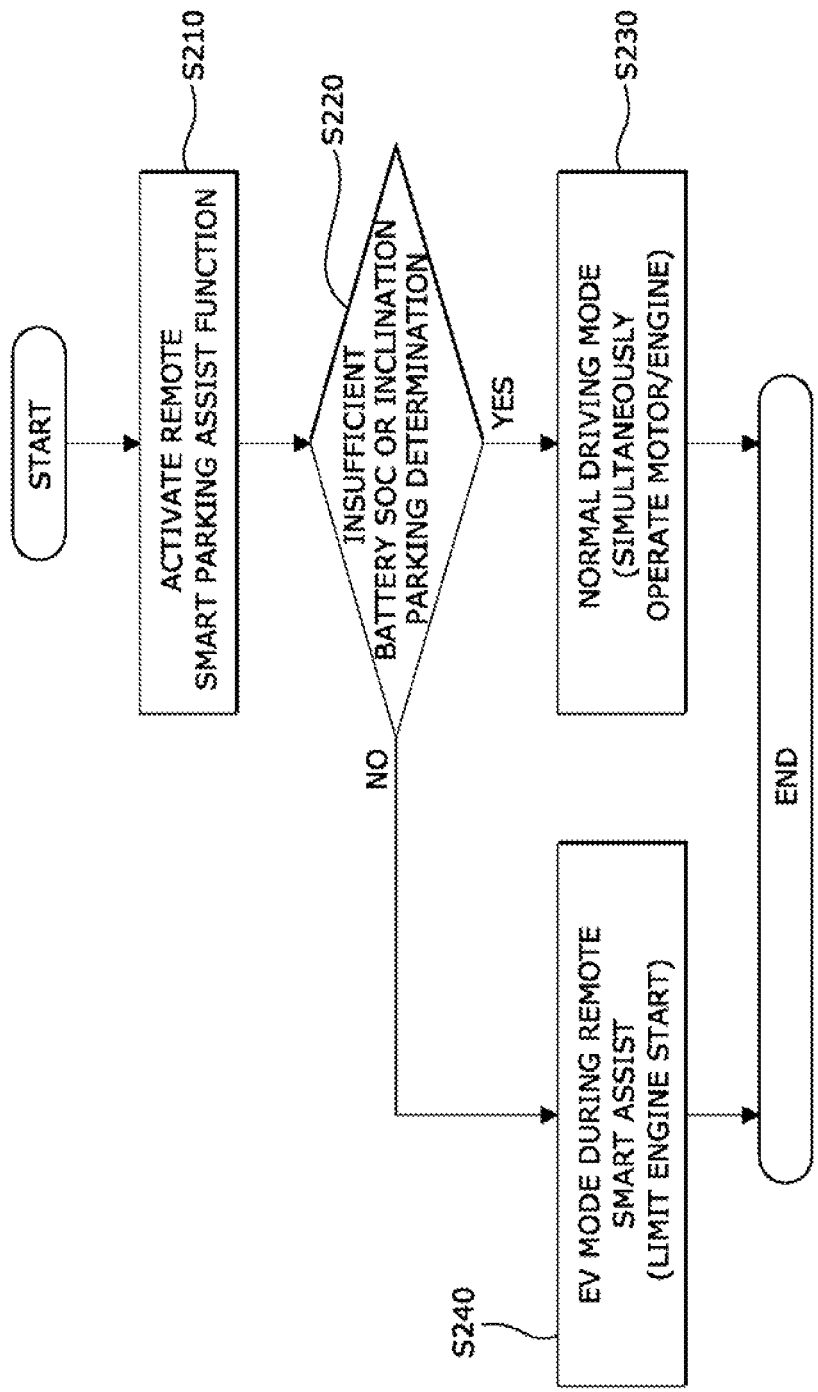
FIG. 6 is a flowchart for explaining another exemplary method of controlling engine start in hybrid vehicles according to an exemplary embodiment of the present disclosure.

FIG. 6 is a flowchart for explaining another exemplary method of controlling engine start in hybrid vehicles according to an exemplary embodiment of the present disclosure.

Referring to FIG. 6, the method of controlling engine start in hybrid vehicles according to another embodiment of the present disclosure may comprise an operation step S210, a determination step S220, and a setting step S230.

When a remote smart assist signal is received, the operation step S210 may activate a remote smart parking assist (RSPA) function. That is, the operation step S210 may activate a remote smart parking assist function.

The determination step S220 may determine whether to start an engine of a hybrid vehicle based on the current state of the hybrid vehicle in which the RSPA function is activated. For example, the determination step S220 may determine whether an EV mode is able to be operated by checking whether an SOC of a main battery is insufficient and an inclination.

The setting step S230/S240 may set a first driving mode using an electric motor when it is determined that the engine is not able to be started (S240), or may set a second driving mode in which the engine is started instead of the electric motor when it is determined that the engine is able to be started (S230).

That is, the setting step S230/S240 may terminate the mode or switch to an engine operable mode when it is determined that only the EV mode is not operable (S240), or may operate an engine operation limit mode when it is determined that only the EV mode is operable (S230).

For example, the setting step S130 may operate only the EV mode during remote smart assist according to the surrounding environment, and limit the engine start until a driver/passenger gets into the vehicle.

Figure 7:
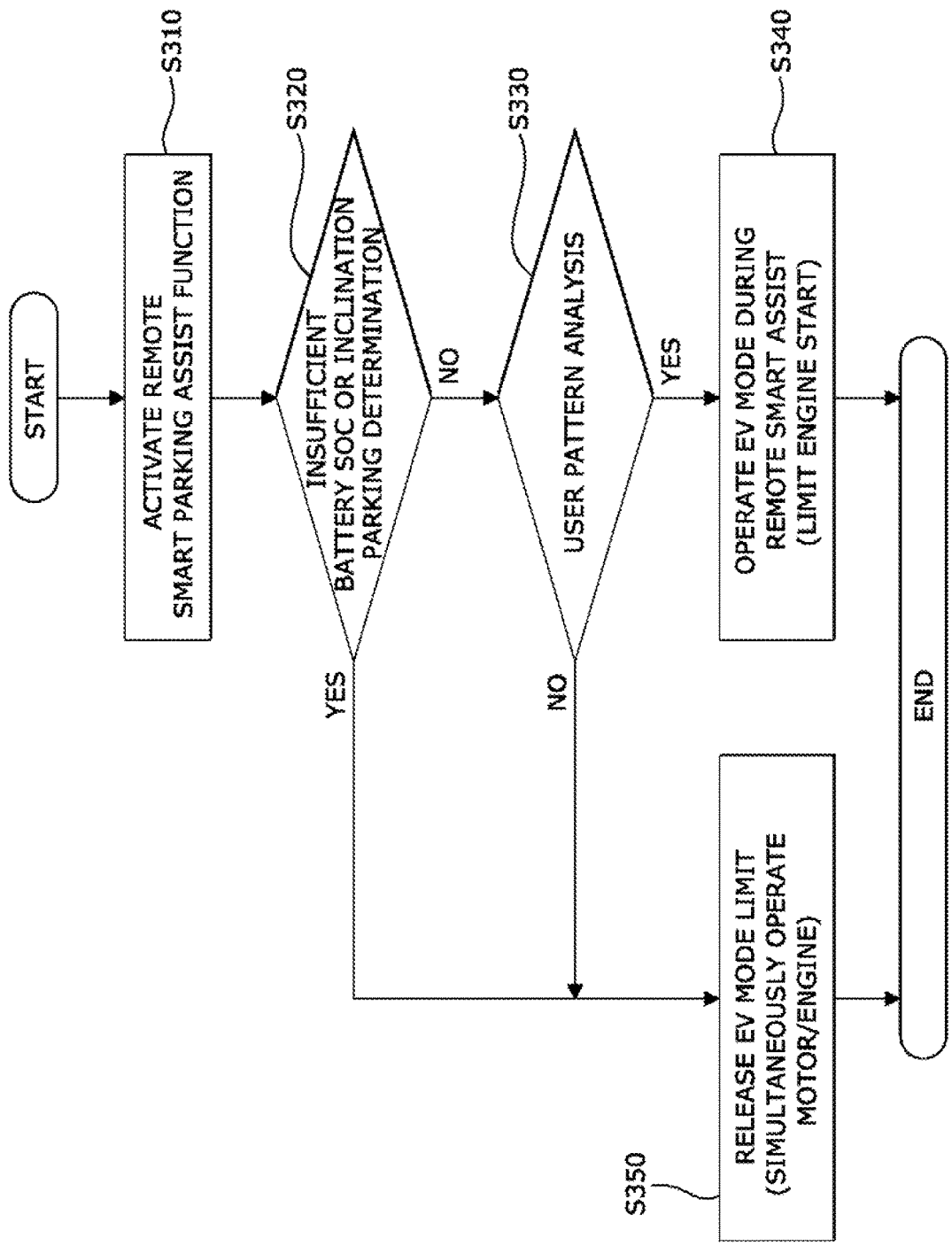
FIG. 7 is a diagram for explaining a further exemplary method of controlling engine start in hybrid vehicles according to an exemplary embodiment of the present disclosure.

FIG. 7 is a diagram for explaining a further exemplary method of controlling engine start in hybrid vehicles according to an exemplary embodiment of the present disclosure.

Referring to FIG. 7, the method of controlling engine start in hybrid vehicles according to the further embodiment of the present disclosure may comprise an operation step S310, a determination step S320, a setting step S330, and a release step S350.

When a remote smart assist signal is received, the operation step S310 may activate a remote smart parking assist (RSPA) function. That is, the operation step S310 may activate a remote smart parking assist function.

The determination step S320 may determine whether to start an engine of a hybrid vehicle based on the current state of the hybrid vehicle in which the RSPA function is activated.

When the current state of the hybrid vehicle satisfies at least one of a system state condition, a driving state condition, and a driver's intention condition, the determination step S320 may determine that the engine is able to be started. For example, the determination step S120 may determine whether an EV mode is able to be operated by checking whether an SOC of a main battery is insufficient and an inclination.

The setting step S330 may set the vehicle to enter the EV mode through driver/user pattern analysis rather than always entering the EV mode during RSPA activation (S340). The user pattern analysis may be used to determine whether to enter by the average number of times/ratio or the like by determining whether the engine has been started unnecessarily before.

For example, the unnecessary engine start may be determined based on the fact that the engine is turned off immediately after the engine is started while the RSPA function is activated, or that the vehicle has not moved more than a certain distance. In addition, it is also possible to determine user pattern analysis/entry through AI big data with factors such as a main smart key (1st), a secondary smart key (2nd), a current time, a parking time, a parking position, a distance between a driver and a vehicle, and a position thereof.

The release step S340/S350 may limit the engine start when the user pattern analysis is satisfied and operate a first driving mode using the electric motor (S340), or may operate a second driving mode in which the engine is able to be started when the user pattern analysis is not satisfied (S350). When the user pattern analysis is not satisfied in the release step S340/S350, the electric motor and the engine may be simultaneously operated.

That is, as described above, the method of controlling engine start in hybrid vehicles according to the further embodiment of the present disclosure may be performed to gradually extend the time of the engine start during the current activation of RSPA by analyzing the driver usage pattern and to limit the engine start.

The present disclosure described above can be implemented as computer-readable code on media in which programs are recorded. Computer-readable media comprise all types of recording devices to store data readable by computer systems. Examples of the computer-readable media include a hard disk drive (HDD), a solid state drive (SSD), a silicon disk drive (SDD), ROM, RAM, CD-ROM, a magnetic tape, a floppy disk, an optical data storage, etc.

As is apparent from the above description, the hybrid vehicle of the present disclosure is configured to determine the actual driving schedule and start the engine when the remote smart parking assist function is activated. Therefore, it is possible to prevent unnecessary engine start and thus fuel consumption.

In addition, the hybrid vehicle according to the present disclosure is configured to determine the actual driving schedule and start the engine when the remote smart parking assist function is activated. Therefore, it is possible to prevent unnecessary engine start to quickly realize carbon neutrality.

Moreover, the hybrid vehicle according to the present disclosure is configured to adjust the engine start time when the remote smart parking assist function is activated to limit the operation of the engine before the driver/occupant gets into the vehicle. Therefore, it is possible to protect the user from engine operating noise and engine exhaust gas.

Furthermore, the hybrid vehicle according to the present disclosure is configured to limit the operation of the engine before the driver/occupant gets into the vehicle when the remote smart parking assist function is activated, so as to protect the user from engine operating noise and engine exhaust gas. Therefore, it is possible to increase the satisfaction of the driver/occupant while improving the merchantable quality of the vehicle.

The present disclosure is not limited to the above-mentioned effects, and other effects of the present disclosure can be clearly understood by those skilled in the art to which the present disclosure pertains from the above description.

The present disclosure should be construed not as restrictive but merely as illustrative in all respects. It is intended that the present disclosure cover the modifications and variations of this disclosure provided they come within the scope of the appended claims and their equivalents.

What is claimed is:

1. A method of controlling an engine start in a hybrid vehicle, the method comprising:
   activating a remote smart parking assist (RSPA) function when a remote smart assist signal is received;
   determining whether to start an engine of a hybrid vehicle based on a current state of the hybrid vehicle in which the RSPA function is activated;
   setting a first driving mode using an electric motor when it is determined that the engine is not able to be started; and
   releasing the first driving mode when a riding determination condition is satisfied in a state of the first driving mode.

2. The method according to claim 1, further comprising:
   releasing the first driving mode; and
   switching to a second driving mode in which the engine is able to be started.

3. The method according to claim 1, wherein the determining whether to start an engine of a hybrid vehicle comprises determining that the engine is able to be started when the current state of the hybrid vehicle satisfies one or more of the following:
   a system state condition;
   a driving state condition; and
   a driver's intention condition.

4. The method according to claim 3, wherein the system state condition comprises one or more of the following:
   when a state of charge (SOC) of a battery of the hybrid vehicle is lower than a preset reference SOC;
   when the electric motor has a temperature higher than a preset reference motor temperature; and
   when the battery of the hybrid vehicle has a temperature higher than a preset reference battery temperature.

5. The method according to claim 3, wherein the driving state condition comprises when an inclination of the hybrid vehicle that is pulled out is greater than a preset reference inclination.

6. The method according to claim 3, wherein the driver's intention condition comprises when a required power, based on an accelerator pedal sensor, exceeds a maximum output of the electric motor.

7. The method according to claim 1, comprising:
   detecting one or more of the following: a trunk; a door; a driver's seat; a safety belt; and a vicinity of the hybrid vehicle, using at least one vehicle sensor installed in the hybrid vehicle; and
   determining the riding determination condition based on a detected value.

8. The method according to claim 7, wherein the releasing the first driving mode comprises:
   determining that the riding determination condition is satisfied when:
     both the trunk and the door are closed;
     a driver is in the hybrid vehicle or wears the safety belt; or
     there is no change in position in the vicinity of the hybrid vehicle; and
   releasing the first driving mode.

9. The method according to claim 7, wherein the setting of a first driving mode comprises:
   analyzing a driving pattern of a driver; and
   setting the first driving mode or a second driving mode based on a result value of the driving pattern.

10. A non-transitory computer-readable medium comprising a program for executing the method of controlling engine start in hybrid vehicles according to claim 1.

11. A hybrid vehicle comprising:
a hybrid control unit configured to control a remote smart parking assist (RSPA) function when a remote smart assist signal is received, wherein the hybrid control unit comprises:
   a determination unit configured to determine whether to start an engine of the hybrid vehicle based on a current state of the hybrid vehicle in which the RSPA function is activated;
   a setting unit configured to set a first driving mode using an electric motor when it is determined that the engine is not able to be started; and
   a releasing unit configured to release the first driving mode when a riding determination condition is satisfied in the state of the first driving mode.

12. The hybrid vehicle according to claim 11, wherein the releasing unit is further configured to:
release the first driving mode; and
switch to a second driving mode in which the engine is able to be started.

13. The hybrid vehicle according to claim 11, wherein the determination unit is further configured to determine that the engine is able to be started when the current state of the hybrid vehicle satisfies one or more of the following:
a system state condition;
a driving state condition; and
a driver's intention condition.

14. The hybrid vehicle according to claim 13, wherein the system state condition comprises one or more of the following:
when a state of charge (SOC) of a battery in the hybrid vehicle is lower than a preset reference SOC;
when the electric motor has a temperature higher than a preset reference motor temperature; and
when the battery of the hybrid vehicle has a temperature higher than a preset reference battery temperature.

15. The hybrid vehicle according to claim 13, wherein the driving state condition comprises when an inclination of the hybrid vehicle that is pulled out is greater than a preset reference inclination.

16. The hybrid vehicle according to claim 13, wherein the driver's intention condition comprises when a required power, based on an accelerator pedal sensor, exceeds a maximum output of the electric motor.

17. The hybrid vehicle according to claim 11, wherein:
at least one vehicle sensor installed in the hybrid vehicle is configured to detect one or more of the following: a trunk; a door; a driver's seat; a safety belt; and a vicinity of the hybrid vehicle; and
the riding determination condition is determined based on a detected value.

18. The hybrid vehicle according to claim 17, wherein the release unit is further configured to:
determine that the riding determination condition is satisfied when:
   both the trunk and the door are closed;
   a driver is in the vehicle or wears the safety belt; or
   there is no change in position in the vicinity of the hybrid vehicle; and
release the first driving mode.

19. The hybrid vehicle according to claim 17, wherein the setting unit is further configured to:
analyze a driving pattern of a driver; and
set the first driving mode or a second driving mode based on a result value of the analyzed driving pattern.

* * * * *